Dec. 14, 1943.  E. D. CLICKNER  2,336,981
FISHING REEL ARBOR
Filed March 17, 1941
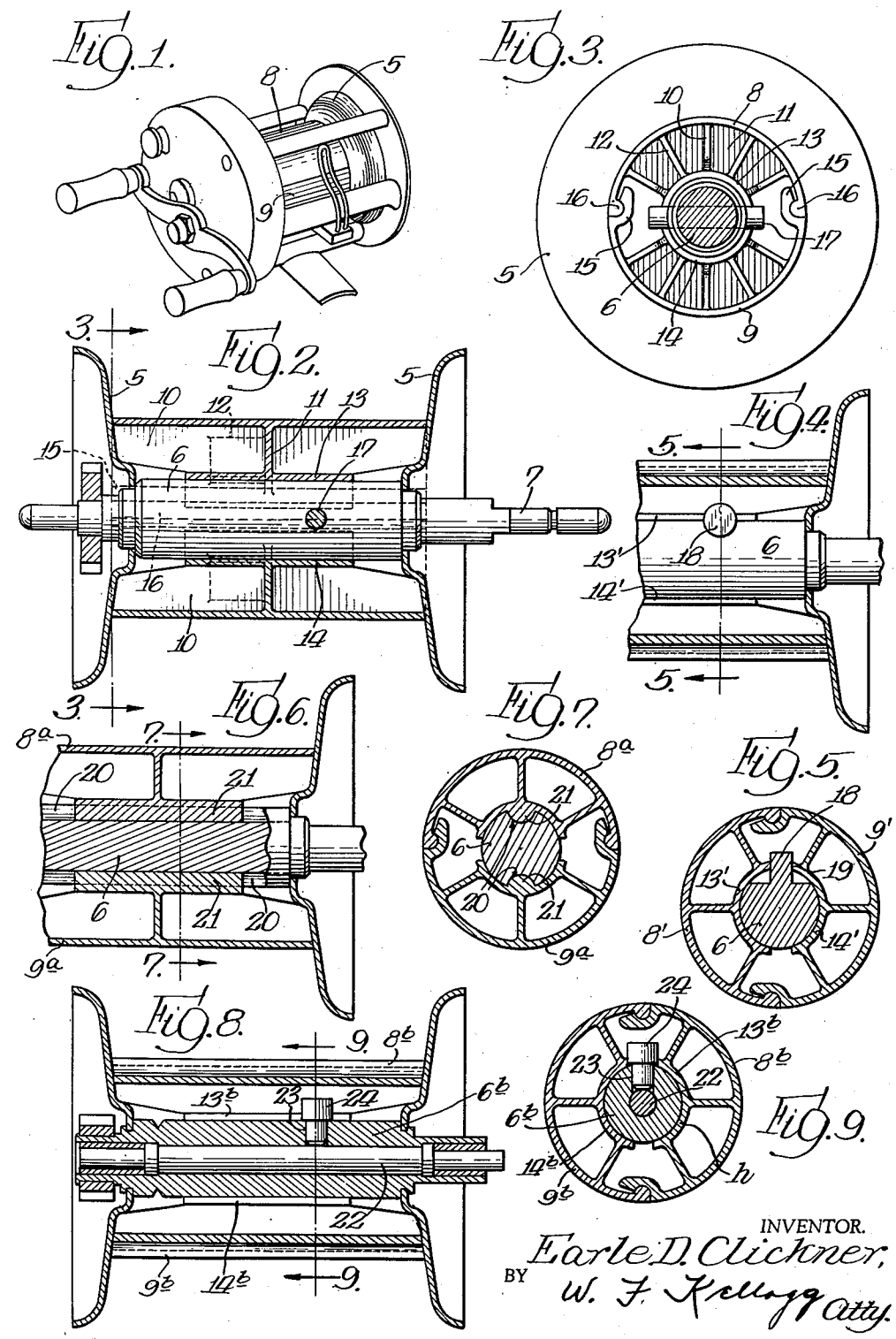
INVENTOR.
Earle D. Clickner,
BY W. F. Kellogg Atty.

Patented Dec. 14, 1943

2,336,981

UNITED STATES PATENT OFFICE 2,336,981

FISHING REEL ARBOR

Earle D. Clickner, Kalamazoo, Mich., assignor to Shakespeare Company, Kalamazoo, Mich., a corporation of Michigan Application March 17, 1941, Serial No. 383,660

9 Claims. (Cl. 242—118)

This invention relates to improvements in fishing reels and more particularly to an attachment for the spools of such reels, having for an object to provide a detachable plastic arbor so constructed as to afford a maximum of durability, a minimum of weight, and the constant maintenance of balance of a reel equipped with the same.

Yet another object of the invention is to provide an arbor of the stated character capable of convenient and quick attachment to or detachment from a spool, and which when attached, will be caused to collectively rotate with the reel spool during both reeling and unreeling operations of the latter.

Other objects will be in part obvious and in part pointed out hereinafter.

The usage of fishing reel arbors made of balsa wood and cork is, at this time, well known in the art. Such arbors have been constructed of one piece and in sections—often in longitudinally divided sections. Many reels now on the market are equipped with either a solid cork or balsa wood arbor which cannot be removed without destroying the same while sectional arbors, made of the same kind of materials, are secured to the spool barrel or sleeve by binding, tying or like more or less make-shift and generally inefficient means.

It is well recognized and granted that spool arbors, such as above, have not proved satisfactory, for whereas one of the prime requisites—that of lightness of material—is satisfactorily answered, the major and all important requirements for durability and stability (the ability of the utilized material to retain its original body, shape and balance) in actual use over a reasonable time period are not obtainable. Hence, the performance results of these known and heretofore used spool arbors, generally, are unsatisfactory. In consequence, it becomes highly desirable to provide an arbor which will avoid those disadvantages and objectionable characteristics above generally set out. To such ends, my invention provides an arbor possessed of but a minimum weight with maximum of circumferential area; an arbor which can be rapidly attached or fitted to a spool barrel without liability of unwanted displacement therefrom or relative rotary movement between it and the spool barrel without usage of special tools, and, all important, an arbor which by reason of its construction, will satisfactorily maintain its body, shape, properties of durability and wear resistance, inherent strength and overall balance or weight distribution throughout a prolonged period of usage.

In order that the invention and its mode of operation may be readily understood by those skilled in the art to which it appertains, I have in the accompanying drawing and the detailed description based thereupon, set out several embodiments of my invention.

In this drawing,

Figure 1 is a perspective view of a fishing reel having its spool equipped with the improved arbor.

Figure 2 is an enlarged longitudinal section through a reel spool and the improved arbor.

Figure 3 is a transverse section taken on the line 3—3 of Figure 2, looking in the direction in which the arrows point and in which the left-hand flange shown in Figure 2, has been removed.

Figure 4 is a fragmentary detail in longitudinal section showing a slightly modified type of driving connection between the spool and the arbor.

Figure 5 is a transverse section taken on the line 5—5 of Figure 4, looking in the direction in which the arrows point.

Figure 6 is a fragmentary longitudinal section taken through another modified form of the arbor showing a different type of driving connection between a reel spool equipped therewith and the arbor.

Figure 7 is a transverse section taken on line 7—7 of Figure 6 looking in the direction in which the arrows point.

Figure 8 is a longitudinal section through still another modified form of driving connection between an equipped reel spool and the improved arbor, the barrel of the reel spool being hollow and mounted upon a non-rotating shaft or axle; and Figure 9 is a transverse section taken on the line 9—9 of Figure 8, looking in the direction in which the arrows point.

Having more particular reference to the drawing, in connection with which like characters of reference will designate corresponding parts throughout, I have, for purposes of illustration, shown my improved arbor attached to one type of a fishing reel spool, the construction of which includes the usual flanges 5, barrel 6 and spindles 7. The arbor consists of semi-cylindrical sections 8 and 9 molded from a plastic material, well known in the art. Relatively spaced longitudinally disposed ribs 10 are integrally molded or formed upon the inner sides of the sections 8 and 9 in relatively spaced relationship and are preferably intermediately braced by a transversely disposed rib 11 also integrally molded therewith and with their respective arbor sections 8 and 9. If desired, additional and comparatively short reinforcing ribs 12 may be provided upon the inner sides and intermediate portions of the arbor sections 8 and 9 between and parallel to the aforesaid longitudinally disposed ribs 10. It will be noted, in this connection, that the additional reinforcing ribs are materially shorter than are the ribs 10 and that by reason of their intermediate positioning with relation to their respective arbor sections, effectually reinforce the adjacent portions of the same.

Transversely curved bearing plates 13 and 14 are formed upon and carried by intermediate portions of the ribs 10 and upon the ribs 11 and 12. These bearing plates are arranged parallel to the longitudinal axis of their respective semi-cylindrical arbor sections 8 and 9 and as will be noted, their opposite sides are arranged inwardly of the corresponding opposite sides of the arbor sections 8 and 9 for a purpose which will be subsequently apparent.

The arbor section 9 is provided with integral trough-like flanges 15 upon its opposite side or marginal portions and as will be observed, such flanges are inwardly offset with relation to adjacent portions of the peripheral surface of the arbor section.

The arbor section 8 has inwardly disposed longitudinally extending lips or thickened portions 16 formed upon the inner faces of its opposite sides and as will be noted, the cross-sectional size and shape of each of these lips 16 is such that they will find, at times, snug reception within the trough-like flanges 15.

The plastic material from which the arbor sections are molded, as will be appreciated, is possessed of inherent resiliency. Consequently, when said arbor sections 8 and 9 are brought into juxtaposed relation and lightly forced toward each other, the inwardly disposed lips 16 will be springingly engaged within and retained by the particular adjacent trough-like flanges 15 and therefore, the arbor sections will be securely though detachably interconnected. It is to be also noted that with juxtapositioning of the arbor sections 8 and 9, in the manner indicated, the transversely curved bearing plates 13 and 14 will be arranged in opposed relation, constituting a circular bearing for engagement with and about the spool barrel 6. Due, however, to the inseting of the opposite sides of the plates 13 and 14 with respect to the opposite sides of their particular arbor sections 8 and 9, longitudinal spacings or ways will be effected therebetween and receive therein the extended opposite portions of a coupling pin 17 engaged through a diametrical hole or way formed in an appropriate part of the spool barrel 6. Thus, it will be seen that positive driving connection will be effected between the spool and the arbor whereby the latter will be caused to collectively rotate with the former during reeling and unreeling operations.

At this point it may be noted that the lengths of the arbor sections 8 and 9 are such as to be snugly received between the spool flanges 5; also, that the opposite ends of the longitudinal ribs 10 are shaped to conform with the adjacent inner side portions of the flanges 5, hence, insuring firm and absolutely concentric position of the arbor upon the spool.

Removal of the sectional arbor from an equipped spool may be readily effected by engaging a blade or similar device between certain of the interconnected marginal portions or sides of the arbor sections and forcing them apart so as to disengage the particular adjacent lip 16 of the arbor section 8 from the adjacent trough-like flange 15 of the arbor 9, whereupon said arbor sections may be removed from the spool barrel.

Different arrangements or constructions for effecting driving connection of an equipped reel spool barrel with the improved arbor, of course, may be provided. To such end and in illustration, constructions such as shown in the Figures 4, 6 and 8 might be utilized.

In the modified form of driving connection or coupling element illustrated in Figure 4, a radially and outwardly extending finger 18 is formed or otherwise provided upon a part of the periphery of the barrel 6 and is adapted to be engaged between the relatively spaced edges or sides of the transversely curved bearing plates 13' and 14' of the arbor sections 8' and 8'. Consequently, upon such arrangement and interengagement, it will be understood that the sectional arbor when engaged with a reel spool, in the manner heretofore explained, will be caused to collectively rotate during both reeling and unreeling operations of the former.

In the Figure 6, instead of the spool barrel 6 carrying a coupling element or pin 17, such barrel may be formed or otherwise provided with substantially diametrically opposed channels or ways 20. Keys or ribs 21, fixedly carried by appropriate portions of the arbor sections 8ª and 9ª and disposed longitudinally of the same, are engageable in the particularly adjacent channels or ways 20 upon assembly of the sectional arbor, as aforesaid. Consequently, following such assembly of the sectional arbor and engagement of the keys 21 in the channels 20, positive connection will be effected between the spool barrel and the sectional arbor, insuring collective rotation of the latter with the former.

Still another form of driving connection or coupling between the sectional arbor, when engaged about a spool barrel is illustrated in the Figure 8. In this particular embodiment, a hollow spool barrel 6ᵇ is provided and receives an axle 22, or its equivalent, therethrough; the barrel 6ᵇ and in consequence, its reel spool, being adapted to rotate about the axle 22. The spool barrel 6ᵇ has a radially disposed opening 23 formed in a portion thereof. Into this opening, the shank portion of a pin 24 is adapted to be snugly introduced. The head portion of the pin, as shown in Figure 9, is received between certain of the juxtaposed marginal portions or sides of the curved bearing plates 13ᵇ and 14ᵇ, hence, effecting a positive driving connection between the sectional arbor and the equipped spool whereby to cause collective rotation of the two.

This latter form of connection is particularly applicable for usage in those types of reels wherein non-rotating shafts or axles are utilized to rotatably support the reel spool.

Notwithstanding the hereinbefore described means for effecting driving connection between my improved arbor with the barrel or sleeve of an equipped reel spool, it will be understood that the teachings effected by the invention are, generally, directed to the connecting or coupling of the arbor to the spool reel or its barrel in a manner whereby positive collective rotation of such element will be insured during all rotative movement of the reel spool.

The salient characteristics of the invention reside in the provision of a fishing reel arbor constructed of plastic or similar material affording maximum of durability, a minimum of weight with maximum of circumferential area, and an arbor the material of construction and construction of which is such that the same will positively retain its original body, shape and balance and will not be susceptible to deterioration of the character hereinbefore indicated, during or throughout the period of usage thereof.

I claim:

1. A fishing reel arbor, comprising body sections, linear-like receiving means adjacent and extending substantially throughout the longitudinal marginal portions of one thereof, linear-like engaging means adjacent and extending substantially throughout the longitudinal marginal portions of another thereof, enterable into said receiving means, and means for connecting the arbor to the barrel of a reel spool.

2. A fishing reel arbor, comprising in combination with a fishing reel spool interengageable sections constructed of partially rigid and form retaining material, ribs upon the normally inner sides of said sections, and bearing plates carried by said ribs substantially parallel to the longitudinal axis of their respective sections, engageable with and about the barrel of the fishing reel spool and means engaging portions of said bearing plates and barrel interconnecting the same for collective rotation.

3. A arbor for fishing reels, comprising body sections, interengageable linear-like means integral with said body sections parallel to and extending throughout the lengths of the opposite sides thereof, and means on the inner sides of said sections connectable to the barrel of a fishing reel spool.

4. An arbor for fishing reels, comprising body sections, inherently elastic means carried by and extending throughout the lengths of the opposite sides of said sections detachably securing the same together, and means on the inner sides of said sections engageable with the barrel of a fishing reel spool.

5. An arbor for fishing reels, comprising shell-like sections, inherently elastic means on said sections parallel to and extending throughout the lengths of the opposite sides thereof, detachably securing the same together, and bearing means on the inner sides of each said sections connectable to a fishing reel spool.

6. An arbor for fishing reels, comprising shell-like sections of partially rigid material, interengageable linear-like inherently elastic means integral with said sections parallel to and extending throughout the lengths of their respective opposite sides detachably securing the same together, and bearing means on the inner sides of each said sections connectable to the barrel of a fishing reel spool.

7. An arbor for fishing reels, comprising form retaining and partially rigid shell-like bodies, trough-like flanges on the opposite sides of one of said bodies extending throughout the lengths thereof, longitudinally extending lips on the inner faces of the opposite side portions of the remaining body engageable in said trough-like flanges, and bearing means on the inner sides of each said bodies.

8. An arbor for fishing reels, comprising shell-like sections, trough-like flanges on the opposite side portions of certain of the sections extending throughout the length of the same, longitudinally extending lips upon the inner face of the other of said sections in proximity and parallel to the opposite side portions thereof engageable in said trough-like flanges, and bearing means on the inner sides of each said sections engageable with the barrel of a fishing reel spool.

9. An arbor for fishing reels, comprising shell-like sections, inherently elastic trough-like flanges carried on certain of the opposite sides of said sections extending throughout their respective lengths and inwardly offset with relation thereto, means on the inner sides of the remaining side portions of said sections receivable by said trough-like flanges, and bearing means on the inner sides of each said sections engageable with the barrel of a fishing reel spool.

EARLE D. CLICKNER.